United States Patent
Alhashim

(10) Patent No.: US 9,740,010 B2
(45) Date of Patent: Aug. 22, 2017

(54) WATERPROOF VIRTUAL REALITY GOGGLE AND SENSOR SYSTEM

(71) Applicant: Mahmoud A. Alhashim, La Verne, CA (US)

(72) Inventor: Mahmoud A. Alhashim, La Verne, CA (US)

(*) Notice: Subject to any disclaimer, the term of this patent is extended or adjusted under 35 U.S.C. 154(b) by 238 days.

(21) Appl. No.: 14/555,756

(22) Filed: Nov. 28, 2014

(65) Prior Publication Data

US 2016/0154241 A1    Jun. 2, 2016

(51) Int. Cl.
*G09G 5/00* (2006.01)
*G02B 27/01* (2006.01)
(Continued)

(52) U.S. Cl.
CPC .......... *G02B 27/0172* (2013.01); *A63F 13/00* (2013.01); *A63F 13/212* (2014.09); *A63F 13/24* (2014.09); *G06F 3/011* (2013.01); *G06F 3/012* (2013.01); *G06F 3/014* (2013.01); *G06T 19/006* (2013.01); *H04N 13/044* (2013.01);
(Continued)

(58) Field of Classification Search
CPC ........ G02B 27/0172; G02B 2027/0129; G02B 2027/0138; G02B 2027/014; G02B 2027/0178; G02B 2027/0187; A63F 13/212; A63F 13/24; A63F 13/00; A63F 13/327; A63F 13/5255;
(Continued)

(56) References Cited

U.S. PATENT DOCUMENTS

| 4,069,405 A * | 1/1978 | Fima | G01F 23/70 200/84 C |
| 5,203,038 A * | 4/1993 | Gibbs | E04H 4/12 4/508 |

(Continued)

FOREIGN PATENT DOCUMENTS

JP    2012-128680 A    7/2012

OTHER PUBLICATIONS

Blain, "Scubus S puts HD video recording, underwater communications and HUD in your diving mask", Nov. 2, 2014.
Chanhee et al., "Smart Swimming Goggles", May 24, 2013.

*Primary Examiner* — Amare Mengistu
*Assistant Examiner* — Crystal A Mathews
(74) *Attorney, Agent, or Firm* — Oblon, McClelland, Maier & Neustadt, L.L.P.

(57) ABSTRACT

A waterproof 3D virtual reality system is described. The virtual reality system includes several key components, such as a submersion tank, an enveloping medium, a waterproof head-mounted display system containing a sensor for tracking the user's head movements and an optical element that displays virtual reality images, waterproof hand sensors, electronic surface sensors, a computer/controller that both receives and transmits location and speed data from sensors worn by the user, and a computer-implemented virtual reality video input signal that is dynamically modified in accordance with movement of the user's head and/or hand sensors. Furthermore, a method of enhancing a user's overall virtual experience is described. This method involves the user occupying a position of partial submersion in a body of fluid, such that the fluid provides buoyancy and resistance to the user.

20 Claims, 7 Drawing Sheets

(51) Int. Cl.
  *G06T 19/00*    (2011.01)
  *G06F 3/01*     (2006.01)
  *A63F 13/00*    (2014.01)
  *A63F 13/24*    (2014.01)
  *A63F 13/212*   (2014.01)
  *H04N 13/04*    (2006.01)
  *A63F 13/5255*  (2014.01)
  *A63F 13/327*   (2014.01)

(52) U.S. Cl.
  CPC ......... *A63F 13/327* (2014.09); *A63F 13/5255* (2014.09); *G02B 2027/014* (2013.01); *G02B 2027/0129* (2013.01); *G02B 2027/0138* (2013.01); *G02B 2027/0178* (2013.01); *G02B 2027/0187* (2013.01)

(58) Field of Classification Search
  CPC ....... G06F 3/011–3/014; G06T 19/006; H04N 13/044
  See application file for complete search history.

(56) References Cited

U.S. PATENT DOCUMENTS

| | | | | |
|---|---|---|---|---|
| 5,271,106 A * | 12/1993 | McClish | ............... | A63B 69/125 352/89 |
| 5,846,134 A * | 12/1998 | Latypov | ................. | A63B 19/04 434/307 R |
| 5,910,772 A * | 6/1999 | Hui | ...................... | G08B 21/084 335/205 |
| 6,157,304 A * | 12/2000 | Bennett | ................ | G08B 21/082 340/522 |
| 6,181,644 B1 * | 1/2001 | Gallagher | .............. | H04B 11/00 367/131 |
| 6,518,913 B1 * | 2/2003 | Satzler | ...................... | G01S 7/02 342/22 |
| 7,046,440 B1 * | 5/2006 | Kaehr | ....................... | E04H 4/14 359/464 |
| 8,195,084 B2 | 6/2012 | Xiao | | |
| 9,104,271 B1 * | 8/2015 | Adams | .................. | G06F 3/0426 |
| 2007/0014928 A1 * | 1/2007 | Delaperriere | ........... | G01T 1/169 427/372.2 |
| 2007/0057781 A1 * | 3/2007 | Breed | .................... | B60K 35/00 340/457.1 |
| 2008/0246974 A1 * | 10/2008 | Wilson | .................. | G01B 11/24 356/634 |
| 2009/0126728 A1 * | 5/2009 | Xiao | ....................... | B63C 11/02 128/202.14 |
| 2010/0110368 A1 * | 5/2010 | Chaum | ................ | G02B 27/017 351/158 |
| 2010/0238161 A1 | 9/2010 | Varga et al. | | |
| 2010/0281440 A1 * | 11/2010 | Underkoffler | ........... | G06F 3/017 715/863 |
| 2011/0202306 A1 * | 8/2011 | Eng | .......................... | A61F 4/00 702/150 |
| 2013/0278631 A1 * | 10/2013 | Border | ................. | G02B 27/017 345/633 |
| 2014/0165898 A1 * | 6/2014 | Cierpka | .................. | G01S 15/89 114/312 |
| 2014/0298269 A1 * | 10/2014 | Underkoffler | ........... | G06F 3/017 715/848 |
| 2015/0035750 A1 * | 2/2015 | Bailey | .................. | G06F 3/0346 345/158 |
| 2015/0192995 A1 * | 7/2015 | Subramanian | .......... | G06F 3/016 340/407.1 |

\* cited by examiner

WATERPROOF VIRTUAL REALITY GOGGLE AND SENSOR SYSTEM

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

FIELD OF THE DISCLOSURE

The present invention relates to a 3D virtual reality system with waterproof components, and a method of applying the 3D virtual reality system wherein the user is partially submerged in an enveloping medium for an enhanced immersive multimedia experience.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Virtual reality (VR) has become the focus of increased attention in recent years. Virtual reality systems are already in practical use in various fields. For example, such systems are being utilized by astronauts for modelling extraterrestrial environments, by doctors to practice an operation before it is conducted, and by military experts to simulate battlefield conditions. Virtual reality systems employ sophisticated computers utilizing multisensory inputs and outputs to create an interactive virtual world in which a product, procedure or human response may be tested without the risks inherent in real-world trials. In order to accurately simulate human interaction with a virtual environment, virtual reality systems aim to facilitate input and output of information representing human senses. In many situations, sight is perhaps the most important sense for immersion into a virtual reality. Accordingly, an optical system for visualization is an important part of most virtual reality systems. Methods for incorporating other senses, in addition to sight, are less explored in the VR realm. By engaging multiple senses, in particular "touch," immersive multimedia is capable of providing the user a more realistic virtual experience. One strategy for incorporating "touch" has been to completely submerse the user in water wherein the water can provide a feeling of low gravity, resistance in movement, or wetness. These aspects can significantly enhance the user experience when the virtual reality features underwater or low gravity environments.

Xiao, Q. (U.S. Pat. No. 8,195,084 B2—incorporated herein by reference in its entirety) disclosed a method of providing a user with a somatosensory experience which involves equipping the user with a breathing apparatus, having the user occupy an underwater environment to provide buoyancy, and using a computer-implemented virtual reality system to provide the user with an extra-terrestrial virtual experience.

Varga, K. et al. (U.S. Patent No. US20100238161A1—incorporated herein by reference in its entirety) disclosed a VR system for projecting safety/mission critical data onto a goggle display. This VR system incorporates an underwater augmented goggle for underwater diving applications wherein critical dive parameters are displayed on the virtual reality goggle in order to provide a safe diving experience.

Kawaura, J. (Japanese Patent No. JP2012128680A—incorporated herein by reference in its entirety) disclosed a VR system for monitoring the safety of swimmers within a swimming pool. This VR system involves a virtual reality display system worn by a lifeguard that can be used for tracking the movement of swimmers within the boundaries of a swimming pool.

The present invention relates to a 3D virtual reality system with waterproof components, wherein the user is partially submerged in an enveloping medium for an enhanced immersive multimedia experience.

SUMMARY

According to a first aspect, the present invention relates to a 3D virtual reality system. The 3D virtual reality system comprises a submersion tank comprising an enveloping medium to partially submerge a user and to provide buoyancy to the user. The 3D virtual reality system includes a waterproof head-mounted display system comprising at least one sensor for tracking the user's head movements and at least one optical element that displays virtual reality images to the user. The 3D virtual reality system includes a plurality of waterproof hand sensors attached to the user to track the user's hand movements as well as at least three electronic surface sensors positioned on the surface of the enveloping medium contained in the submersion tank that define a submersible area. The 3D virtual reality system comprises a computer/controller that both receives location and speed data from a plurality of sensors worn by the user and from the electronic surface sensors around the perimeter of the submersible area, and transmits the location and speed data into the waterproof head-mounted display unit worn by the user. The 3D virtual reality system comprises a computer-implemented virtual reality video input signal that is dynamically modified in accordance with movement of the user's head and/or hand sensors.

In one embodiment, the submersion tank is a container comprising a cavity capable of holding liquid selected from a group consisting of a swimming pool, wading pool, bathtub, and a hot tub.

In a preferred embodiment, the submersion tank is a swimming pool.

In one embodiment, the enveloping medium comprises water.

In one or more embodiments, the waterproof head-mounted display further comprises a head strap to secure the display to the head of the user and a 3D stereoscopic camera with two lenses to provide a source of real-world images. The waterproof head-mounted display further comprises a screen to show virtual images and a plurality of lenses to enlarge and view the screen image in parallax, so that the user may see a 3D virtual image, a real image, boot image, or combinations thereof. The waterproof head-mounted display further includes at least one sensor to send location and speed data to the computer/controller. The waterproof head-mounted display further comprises an outer-membrane, outer-wrapping, outer-compartment, coating, or sealant to protect the electronic components in the head-mounted display from liquid damage.

In one embodiment, the waterproof head-mounted display further comprises a waterproof containment area for housing the computer/controller.

In one embodiment, the waterproof head-mounted display comprises a planetarium display or dome-like ceiling display wherein the user can visualize virtual images projected onto the ceiling of the dome.

In one embodiment, two hand sensors are attached to the user to send location and speed data to the computer/controller.

In one embodiment, a plurality of sensors are attached to the user to track the user's movements.

In one embodiment, the electronic surface sensors are positioned on the surface of the enveloping medium and send horizontal and vertical position data to the computer/controller to define the submersible area and liquid level.

In one embodiment, the submersible area is defined by four electronic surface sensors.

In one or more embodiments, the computer/controller further comprises a communication link for communicating with all of the sensors in the virtual reality system and a graphics processing unit to generate the virtual reality video input signal sent to the waterproof head-mounted display. The computer/controller further comprises a microprocessor-controlled transceiver that both receives real-time rate of change, horizontal, and vertical positional data from a plurality of sensors worn by the user, and also transmits the positional data in real-time to the waterproof head-mounted display. The computer/controller further includes an input device the user can use for selecting and viewing virtual reality environments.

In one embodiment, the communications link is selected from the group consisting of a wired connection and a wireless connection.

In one embodiment, the head-mounted display and computer/controller are linked through wireless communication.

In one embodiment, the head-mounted display is connected to and powered by the computer/controller.

In one embodiment, the computer/controller is a mobile cellular telephone.

In a preferred embodiment, the user is partially submerged and is not attached to a breathing apparatus.

According to a second aspect, the present invention relates to a method, comprising using the 3D virtual reality system wherein the user adopts a position within the submersible area such that one or more sensors are submerged while one or more sensors are not submerged.

In one embodiment, the user experiences a virtual reality of partial submersion while the enveloping medium provides buoyancy and resistance to the user.

In a preferred embodiment, the user's head is above water at all times while other parts of the user's body are submerged.

In one embodiment, the virtual reality system is used for gaming, exercising, education, simulation, or entertainment purposes.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
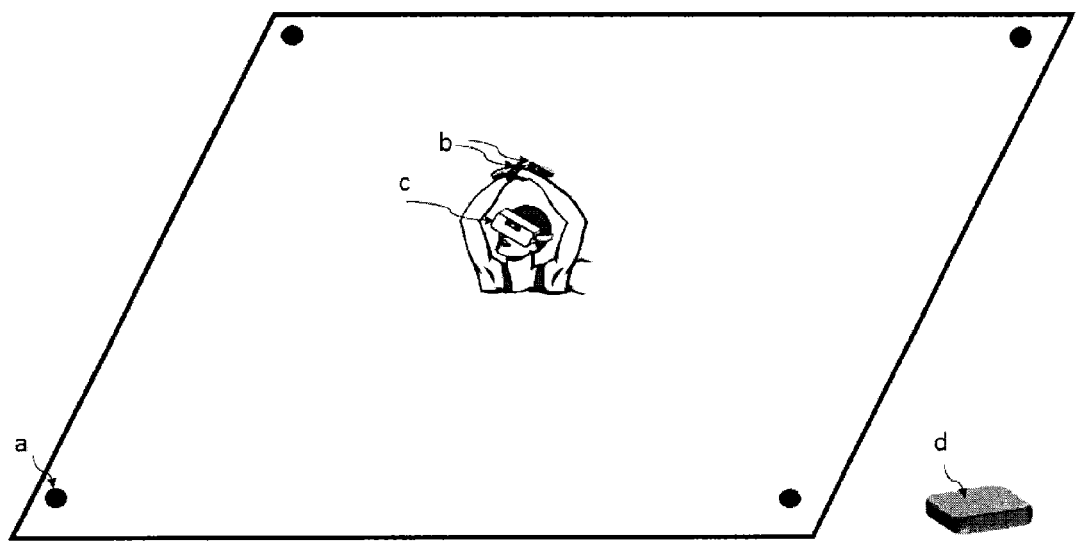
FIG. 1 is an illustration of a 3D virtual reality system, comprising: electronic surface sensors (a), waterproof hand sensors (b), waterproof head-mounted display (c), controller/computer (d).

Referring now to the drawings, wherein like reference numerals designate identical or corresponding parts throughout the several views.

The present invention relates to a 3D virtual reality system, wherein the 3D virtual reality system comprises a submersion tank comprising an enveloping medium, a waterproof head-mounted display (c) comprising a sensor (i), waterproof hand sensors (b), electronic surface sensors (a), a computer/controller (d), and a computer-implemented video input signal. Several of these components are depicted in FIG. 1. Also seen in FIG. 1, the present invention relates to a method of using the 3D virtual reality system, wherein the user adopts a position within the submersible area such that one or more sensors are submerged while one or more sensors are not submerged.

In a preferred embodiment, the user is partially submerged and is not attached to a breathing apparatus.

Virtual reality (VR), sometimes referred to as immersive multimedia, is a computer-simulated environment that can simulate physical presence in places in the real world or imagined worlds. Virtual reality can recreate sensory experiences, including virtual taste, sight, smell, sound, touch. For purposes of the present invention, the virtual reality system preferably recreates sensory experiences primarily of vision and touch. A somatosensory system is a complex sensory system that comprises "touch." While touch is considered one of the five traditional senses, the impression of touch is formed from several modalities including pressure, skin stretch, vibration and temperature. The present VR invention relates to a system wherein the user adopts a partially submerged position (see FIG. 1) within an enveloping medium, such that the user is provided with a somatosensory experience while simultaneously experiencing a visual sensory experience.

Figure 2:
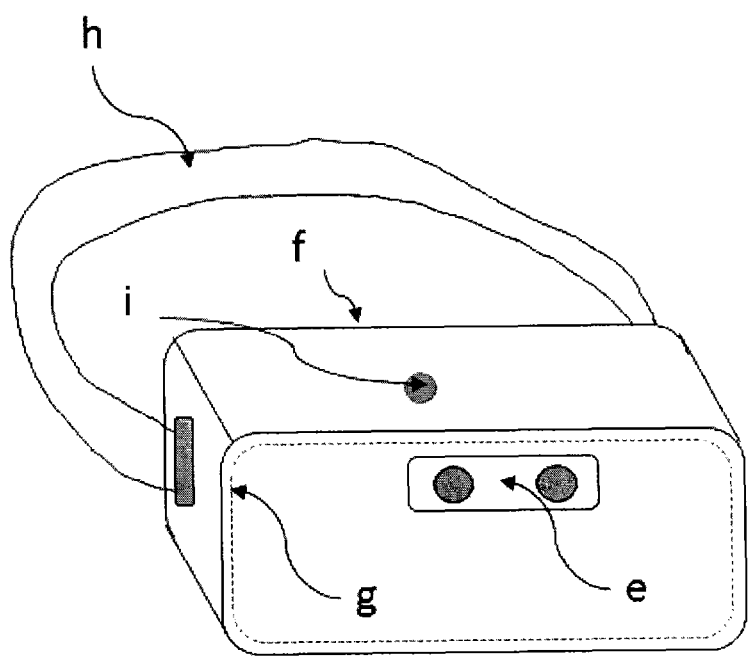
FIG. 2 is an illustration of the waterproof head-mounted display, comprising: a 3D stereo camera (e) with two lenses to capture the real view if needed to overlay real and virtual images, the inside view of the head-mounted display (f), a screen (g) to show the virtual image, a strap (h) to secure the goggle to the user's face, a sensor (i) located on the goggle to send position and speed data to the computer/controller.
Figure 3:
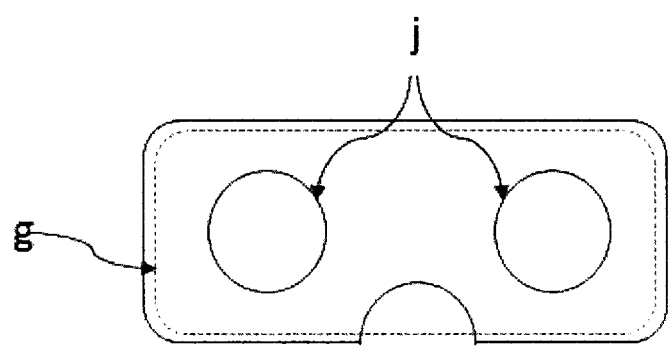
FIG. 3 is an illustration of the inside view of the waterproof head-mounted display, comprising a screen (g) to show the virtual image, two lenses (j) to enlarge and view the screen image in parallax.

The VR system described herein comprises a submersion tank. The submersion tank is a container comprising a cavity capable of holding an enveloping medium to partially submerge a user and to provide buoyancy to the user. In one embodiment, the submersion tank is selected from a group consisting of a swimming pool, wading pool, bathtub, and a hot tub, preferably a swimming pool. Enveloping medium refers to any matter or material with a definite volume but no fixed shape. The enveloping medium can be a solvent, solution, emulsion, or a mixture. Any of these mediums can be comprised of organic or inorganic material, and can be aqueous or non-aqueous. In one embodiment, the enveloping medium is water or oil, preferably water. For purposes of the present invention, the term enveloping refers to covering, surrounding, encompassing. Submersion includes extremity submersion, cephalic submersion, atrial submersion, etc. of a user within the enveloping medium FIG. 2 illustrates the waterproof head-mounted display system and FIG. 3 the inside view of the head-mounted display. A waterproof head-mounted display system can also be referred to as a goggle or mask. The display can resemble a ski goggle, a motorcycle goggle, a swimming goggle, a scuba mask, sunglasses, an astronaut helmet etc. A head-mounted display or helmet mounted display is a display device, worn on the head or as part of a helmet, which has a display optic in front of one or each eye. In one or more embodiments, the waterproof head-mounted display comprises a head strap (h) to secure the display to the head of the user. Stereoscopy is a technique for creating or enhancing the illusion of depth. Most stereoscopic methods present two offset images separately to the left and right eye of the viewer. These two-dimensional images are then combined in the brain to give the perception of three dimension (3D) depth. In another embodiment, the goggle comprises a 3D stereoscopic camera or display (e). The display may comprise a cathode ray tube, liquid crystal displays (LCD), liquid crystal on silicon, organic light emitting diode (LED), etc. The goggles may incorporate a cylindrical lens, a Fresnel lens, a lenticular lens, a gradient index lens, an axion, a superlense, or other optics for additional optical effects. Furthermore, the waterproof head-mounted display may be similar in appearance to an astronaut helmet, and include a planetarium display or dome-like ceiling display wherein the user can visualize virtual images projected onto the ceiling of the dome.

Parallax is a displacement or difference in the apparent position of an object viewed along two different lines of sight, and is measured by the angle or semi-angle of inclination between those two lines. Parallax also affects optical instruments such as binoculars and twin-lens reflex cameras that view objects from slightly different angles. Many animals, including humans, have two eyes with overlapping visual fields that use parallax to gain depth perception. The waterproof head-mounted display further comprises a screen (g) to show virtual images and a plurality of lenses to enlarge and view the screen image in parallax. An optical head-mounted display is a wearable display that has the capability of reflecting projected images as well as allowing the user to see through it. In one embodiment, the goggle comprises two lenses to provide a source of real-world images. Therefore, the head-mounted display system may also be considered an optical head-mounted display, and can project a 3D virtual image, a real image, boot image, or combinations thereof, to the user (as can be seen in FIG. 2. and FIG. 3).

For the purposes of the present invention, the term "sensor" is used to describe components within the virtual reality system that are used to track movement or define the virtual grid. Therefore, the term "sensor" could refer to any device that "emits" a signal, any device that receives the emitted signal, or a combination thereof. In one embodiment, the waterproof head-mounted display further includes at least one sensor (i) to send location and speed data to the computer/controller. This sensor can be attached to permanently or temporarily to the head-mounted display.

Waterproof describes objects relatively unaffected by water or resisting the ingress of water. Such items may be used in wet environments or under water. The head-mounted display further comprises a waterproof barrier, such as an outer-membrane, outer-wrapping, outer-compartment, coating, or sealant to protect the electronic components in the head-mounted display from liquid damage. These barriers may be comprised of rubber, plastics (epoxy, polyester, polyvinyl chloride, polyurethane, fiberglass, etc.), silicone elastomer, fluoropolymers, wax, water proof fabrics (e.g. Gore-Tex), bituminous asphalts, mineral materials (cements, clays, etc.), metals (brass, copper, etc.), and mixtures thereof. In another embodiment, the waterproof head-mounted display further comprises a waterproof containment area for housing the computer/controller.

Figure 4:
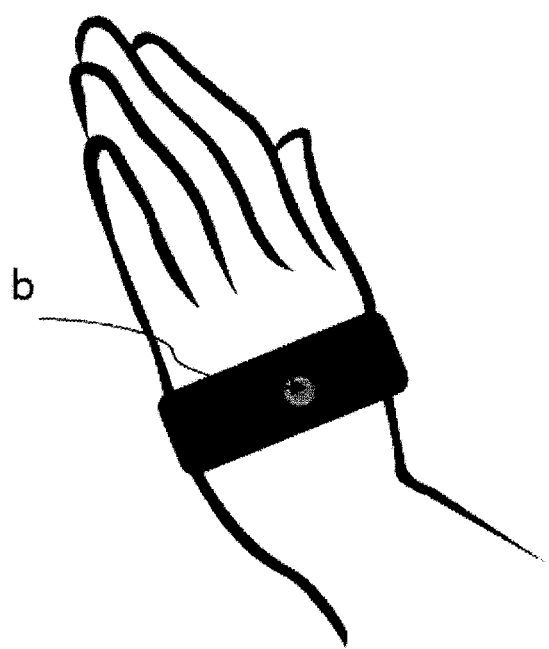
FIG. 4 is an illustration of a waterproof hand sensor (b) used to track the user's hand movements.

FIG. 4 illustrates a waterproof sensor attached to the user's hand to track the user's hand movements. In one embodiment, two hand sensors (b) are attached to the user to send location and speed data to the computer/controller, as in FIG. 1. These sensors can be attached permanently to an article of clothing worn by the user, or can be attached to an article of clothing worn by the user in a removable fashion. These sensors can also be held in the user's hands as the form of attachment. In another embodiment, a plurality of sensors are attached to the user, in addition to the hand sensors, to track the movement of the user's limbs, legs, torso, shoulders, etc.

Figure 5:
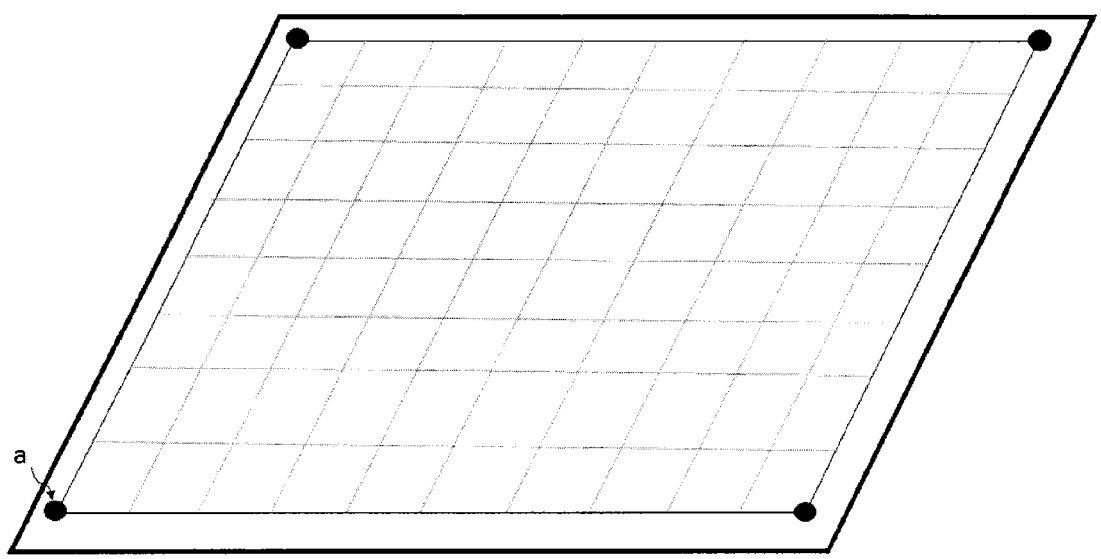
FIG. 5 is an illustration of the electronic surface sensors (a), and how they are used to determine the liquid level and define the submersible area.

FIG. 5 illustrates the sensors that define the submersible area (a) within the submersion tank. In the present invention, the signals sent from emitters to sensors are selected from a group comprising, electromagnetic signals, acoustic signals, optical signals and mechanical signals, or combinations thereof. Electromagnetic tracking systems measure magnetic fields generated by running an electric current sequentially through coiled wires arranged in a perpendicular orientation to one another. Each small coil becomes an electromagnet, and the system's sensors measure how its magnetic field affects the other coils. This measurement tells the system the direction and orientation of the emitter.

Acoustic tracking systems emit and sense ultrasonic sound waves to determine the position and orientation of a target. The system calculates the position and orientation of the target based on the time it took for the sound to reach the sensors.

Optical tracking devices use light to measure a target's position and orientation. The signal emitter in an optical device typically consists of a set of infrared LEDs. The sensors are cameras that can sense the emitted infrared light. The LEDs light up in sequential pulses. The cameras record the pulsed signals and send information to the system's processing unit. The unit can then extrapolate the data to determine the position and orientation of the target.

Mechanical tracking systems rely on a physical connection between the target and a fixed reference point. A common example is a head-mounted display mounted on the end of a mechanical arm that has two points of articulation. The system detects the position and orientation through the arm.

In one embodiment, at least three electronic surface sensors are positioned on the surface of the enveloping medium contained in the submersion tank to define the submersible area. In another embodiment, the electronic surface sensors are positioned on the surface of the enveloping medium and send horizontal and vertical position data to the computer/controller to define the submersible area and liquid level. In a preferred embodiment, the submersible area is defined by four electronic surface sensors (a), as depicted in FIG. 5.

Figure 7:
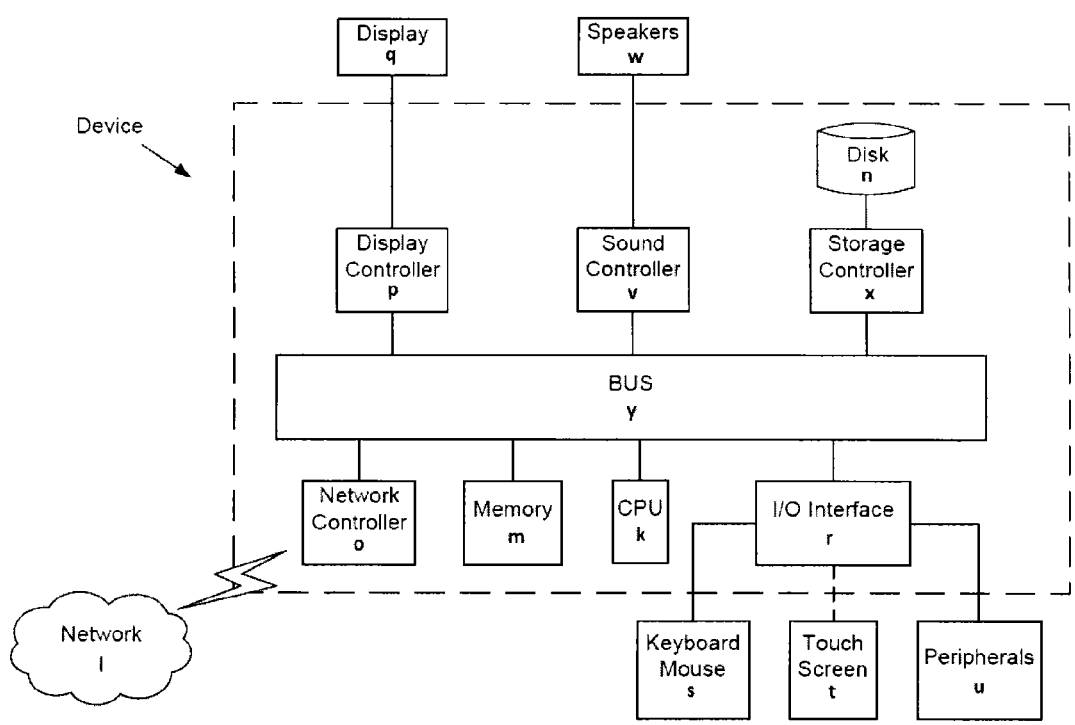
FIG. 7 is an illustration of a computer/controller with several interconnected components: a CPU (k), a network (l), a memory component (m), a disk (n), a network controller (o), a display controller (p), a display (q), an I/O interface (r), a pointing device such as a keyboard/mouse (s), a touch screen (t), a peripheral (u), a sound controller (v), speakers (w), a storage controller (x), a BUS (y)

The 3D virtual reality system comprises a computer/controller (d) that both receives location and speed data from a plurality of sensors worn by the user and transmits said location and speed data into the waterproof head-mounted display unit worn by the user. The 3D virtual reality system comprises a computer-implemented virtual reality video input signal that is dynamically modified in accordance with movement of the user's head and/or hand sensors. A hardware description of the computer/controller according to exemplary embodiments is described with reference to FIG. 7. In FIG. 7, the computer/controller includes a CPU (k) which performs the processes described above. The process data and instructions may be stored in memory (m). These processes and instructions may also be stored on a storage medium disk (n) such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer/controller communicates, such as a server or computer.

Further, the claimed advancements may be provided as a utility application, background daemon, or component of an operating system, or combination thereof, executing in conjunction with CPU (k) and an operating system such as Microsoft Windows 7, UNIX, Solaris, LINUX, Apple MAC-OS and other systems known to those skilled in the art.

CPU (k) may be a Xenon or Core processor from Intel of America or an Opteron processor from AMD of America, or may be other processor types that would be recognized by one of ordinary skill in the art. Alternatively, the CPU (k) may be implemented on an FPGA, ASIC, PLD or using discrete logic circuits, as one of ordinary skill in the art would recognize. Further, CPU (k) may be implemented as multiple processors cooperatively working in parallel to perform the instructions of the inventive processes described above.

The computer/controller in FIG. 7 also includes a network controller (o), such as an Intel Ethernet PRO network interface card from Intel Corporation of America, for interfacing with network (l). In one or more embodiments, the computer/controller comprises a communication link for communicating with all of the sensors in the virtual reality system. As can be appreciated, the network (l) can be a public network, such as the Internet, or a private network such as an LAN or WAN network, or any combination thereof and can also include PSTN or ISDN sub-networks. The network (l) can also be wired, such as an Ethernet network. Wireless communication refers to the transfer of information between two or more points that are not physically connected by an electrical conductor. In terms of the present invention, wireless modes include radio communication, Free-space optical communication, sonic communication, electromagnetic communication, etc. In a preferred embodiment, the head-mounted display and computer/controller are linked through wireless communication. Wireless communication can be, but is not limited to, Bluetooth or Wi-Fi connectivity, cellular data service, mobile satellite communications, or wireless sensor networks. Wi-Fi refers to a wireless local area network that enables portable computing devices to connect easily to the internet with a communication standard IEEE 802.11 connection. Cellular data service can include communication technologies such as GSM, CDMA, GPRS, W-CDMA, EDGE, CDMA2000.

The computer/controller may further include a display controller (p), such as a NVIDIA GeForce GTX or Quadro graphics adaptor from NVIDIA Corporation of America for interfacing with display (q), such as a Hewlett Packard HPL2445w LCD monitor. The computer/controller further includes a controller or input device the user can operate for selecting and viewing virtual reality environments. A controller refers to a chip, expansion card, or a stand-alone device that interfaces with a peripheral device. This may be a link between two parts of a computer or a controller on an external device that manages the operation of that device. This link may be built-in, wired, or wirelessly connected to the computer. A keyboard, mouse, or a touchscreen are typical examples of input device controllers. A general purpose I/O interface (r) interfaces with a keyboard and/or mouse (s) as well as a touch screen panel (t) on or separate from display (q). General purpose I/O interface may also connect to a variety of peripherals (u) including printers and scanners, such as an OfficeJet or DeskJet from Hewlett Packard.

A sound controller (v) may also be provided in the computer/controller, such as Sound Blaster X-Fi Titanium from Creative, to interface with speakers/microphone (w) thereby providing sounds and/or music.

The general purpose storage controller (x) connects the storage medium disk (n) with communication bus (y), which may be an ISA, EISA, VESA, PCI, or similar, for interconnecting all of the components of the computer/controller. A description of the general features and functionality of the display (q), keyboard and/or mouse (s), as well as the display controller (p), storage controller (x), network controller (o), sound controller (v), and general purpose I/O interface (r) is omitted herein for brevity as these features are known.

A graphics processing unit, also occasionally called a visual processing unit, is a specialized electronic circuit designed to rapidly manipulate and alter memory to accelerate the creation of images in a frame buffer intended for output to a display. These units are used in embedded systems, mobile phones, personal computers, workstations, and game consoles. Graphics processing units are very efficient at manipulating computer graphics and image processing, and their highly parallel structure makes them more effective than general-purpose CPUs for algorithms where processing of large blocks of data is done in parallel. They can be present on a video card, or it can be on the motherboard. In one embodiment, the computer/controller comprises a graphics processing unit to generate the virtual reality video input signal sent to the waterproof head-mounted display.

For purposes of the present invention, a transceiver is a device comprising both a transmitter and a receiver which are combined and share common circuitry or a single housing. The computer/controller of the VR system further comprises a microprocessor-controlled transceiver that both receives real-time rate of change, horizontal, and vertical positional data from a plurality of sensors worn by the user, and also transmits said positional data in real-time to the waterproof head-mounted display.

In one embodiment, the head-mounted display is connected to and powered by the computer/controller. In another embodiment, the computer/controller is a mobile cellular telephone. In another embodiment, the computer/controller is a tablet computer device.

According to a second aspect, the present invention relates to a method, comprising arranging the 3D virtual reality system wherein the user adopts a position within the submersible area such that one or more sensors are submerged while one or more sensors are not submerged.

Figure 6:
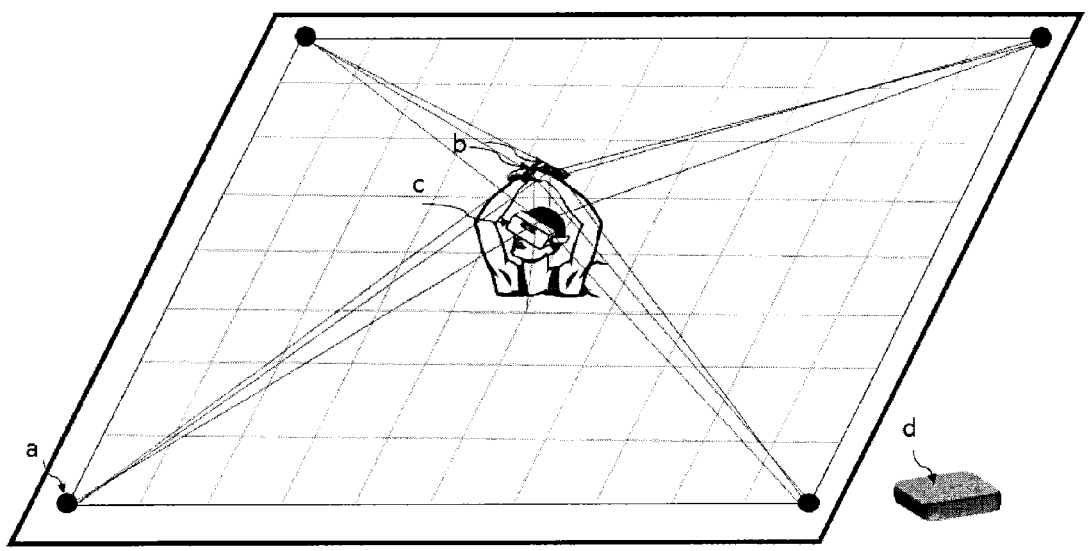
FIG. 6 is an illustration of the electronic surface sensors a and how they are used to determine the liquid level, define the submersible area, the position of the waterproof hand sensors (b), and the position of the sensor located on the waterproof head-mounted display (c).

In one embodiment, the user experiences a virtual reality of partial submersion while the enveloping medium provides buoyancy and resistance to the user. This somatosensory virtual reality experience and method is illustrated in FIG. 6. A buoyancy condition or state of the user relates to the net force exerted on the user both by water surrounding the user in the underwater environment (normally providing an upward force) and by gravity (which the upward force of the water counteracts). The buoyancy condition of the user may be modified by equipping the user with additional objects, such as weights or flotation devices. Furthermore, the buoyancy of the user can be modified by incorporating seats or platforms at various depths beneath the submersible fluid on which the user can stand or sit.

In one embodiment, the virtual reality system is used for gaming, exercising, education, simulation, or entertainment purposes. Examples of these uses include, but are not limited to, military training, water polo, water aerobics, synchronized swimming, flying, surfing, snorkeling, and low gravity simulations.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A 3D virtual reality system, comprising:
   a submersion tank comprising an enveloping medium to partially submerge a user and to provide buoyancy to the user;
   a waterproof head-mounted display system comprising at least one sensor for tracking the user's head movements and at least one optical element that displays virtual reality images to the user;
   a plurality of waterproof hand sensors attached to the user to track the user's hand movements;
   at least three electronic surface sensors positioned on the surface of and partially submerged in the enveloping medium contained in the submersion tank that define a submersible area and continuously track the head-mounted display and hand sensors as the head-mounted display and hand sensors transition to or from above the surface of the enveloping medium in an air environment and below the surface of the enveloping medium in a liquid medium based on their position relative to the position of the surface sensors;
   a computer/controller that both receives location and speed data from the head-mounted display and hand sensors worn by the user and transmits said location and speed data into the waterproof head-mounted display unit worn by the user;
   a computer-implemented virtual reality video input signal that is dynamically modified in accordance with movement of the user's head-mounted display and/or hand sensors.

2. The 3D virtual reality system as claimed in claim 1 wherein the submersion tank is a container comprising a cavity capable of holding liquid selected from a group consisting of a swimming pool, wading pool, bathtub, and a hot tub.

3. The 3D virtual reality system as claimed in claim 2 wherein the enveloping medium is water.

4. The 3D virtual reality system as claimed in claim 1 wherein the waterproof head-mounted display further comprises:
   a head strap to secure the display to the head of the user;
   a 3D stereoscopic camera with two lenses to provide a source of real-world images;
   a screen to show virtual images;
   a plurality of lenses to enlarge and view the screen image in parallax, so that the user sees a 3D virtual image, a real image, or a 3D virtual image and a real image viewed together;
   at least one sensor to send location and speed data to the computer/controller;
   an outer-membrane, outer-wrapping, outer-compartment, coating, or sealant to protect the electronic components in the head-mounted display from liquid damage.

5. The 3D virtual reality system as claimed in claim 4 wherein the waterproof head-mounted display further comprises a waterproof containment area for the computer/controller.

6. The 3D virtual reality system as claimed in claim 5 wherein the head-mounted display is connected to and powered by the computer/controller.

7. The 3D virtual reality system as claimed in claim 6 wherein the computer/controller is a mobile cellular telephone.

8. The 3D virtual reality system as claimed in claim 4, wherein at least one of the plurality of lenses is a Fresnel lens or a lenticular lens.

9. The 3D virtual reality system as claimed in claim 1 wherein two hand sensors are attached to the user to send location and speed data to the computer/controller.

10. The 3D virtual reality system as claimed in claim 1 wherein a plurality of sensors are attached to the user to track the user's movements.

11. The 3D virtual reality system as claimed in claim 1 wherein the electronic surface sensors are positioned on the surface of the enveloping medium and send horizontal and vertical position data to the computer/controller to define the submersible area and liquid level.

12. The 3D virtual reality system as claimed in claim 11 wherein the submersible area is defined by four electronic surface sensors.

13. The 3D virtual reality system as claimed in claim 1 wherein the computer/controller further comprises:
   a communication link for communicating with all of the sensors in the virtual reality system;
   a graphics processing unit to generate the virtual reality video input signal sent to the waterproof head-mounted display;

a microprocessor-controlled transceiver that both receives real-time rate of change, horizontal, and vertical positional data from a plurality of sensors worn by the user, and also transmits the positional data in real-time to the waterproof head-mounted display;

an input device the user can use for selecting and viewing virtual reality environments.

14. The 3D virtual reality system as claimed in claim 13 wherein the communications link is selected from the group consisting of a wired connection and a wireless connection.

15. The 3D virtual reality system as claimed in claim 14 wherein the head-mounted display and computer/controller are linked through wireless communication.

16. The 3D virtual reality system according to claim 1, which does not include a breathing apparatus and wherein the user is partially submerged and is not attached to a breathing apparatus.

17. A method, comprising
applying the 3D virtual reality system according to claim 1, wherein the user adopts a position within the submersible area such that one or more sensors are submerged while one or more sensors are not submerged.

18. The method, according to claim 17, wherein the user experiences a virtual reality of partial submersion while the enveloping medium provides buoyancy and resistance to the user.

19. The method, according to claim 17, wherein the virtual reality system is applied for gaming, exercising, education, simulation, or entertainment purposes.

20. The 3D virtual reality system as claimed in claim 1, further comprising seats or platforms at various depths beneath a surface of the enveloping medium in the submersion tank on which the user can stand or sit.

* * * * *